(12) United States Patent
Campbell

(10) Patent No.: US 7,135,440 B2
(45) Date of Patent: Nov. 14, 2006

(54) METHOD FOR CONTROLLED PLACEMENT OF OILFIELD CHEMICALS AND COMPOSITION USEFUL FOR PRACTICING SAME

(75) Inventor: Samuel Everett Campbell, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 322 days.

(21) Appl. No.: 10/642,901

(22) Filed: Aug. 18, 2003

(65) Prior Publication Data

US 2004/0110645 A1 Jun. 10, 2004

Related U.S. Application Data

(60) Provisional application No. 60/404,733, filed on Aug. 20, 2002.

(51) Int. Cl.
*C09K 8/03* (2006.01)
(52) U.S. Cl. .................. 507/269; 507/271; 507/902; 507/906; 166/305.1
(58) Field of Classification Search ............... 507/269, 507/902, 271, 906; 166/305.1
See application file for complete search history.

(56) References Cited

U.S. PATENT DOCUMENTS

| | | | |
|---|---|---|---|
| 2,836,555 A * | 5/1958 | Armentrout | 507/112 |
| 3,676,363 A * | 7/1972 | Mosier | 264/4.1 |
| 3,756,949 A | 9/1973 | Schreurs | 252/8.55 B |
| 4,192,753 A | 3/1980 | Pye et al. | 252/8.5 A |
| 4,588,640 A | 5/1986 | Matlach | 428/407 |
| 4,659,334 A | 4/1987 | Matlach | 44/51 |
| 4,905,762 A | 3/1990 | Zilch | 166/310 |
| 4,986,354 A * | 1/1991 | Cantu et al. | 166/279 |
| 5,027,901 A | 7/1991 | French et al. | 166/310 |
| 5,753,596 A | 5/1998 | Martin et al. | 507/237 |
| 5,922,652 A | 7/1999 | Kowalski et al. | 507/129 |
| 6,126,872 A | 10/2000 | Kommareddi et al. | 264/4.1 |
| 6,160,036 A | 12/2000 | Kommareddi et al. | 523/175 |
| 6,270,653 B1 | 8/2001 | Gochin et al. | 208/44 |
| 6,326,335 B1 | 12/2001 | Kowalski et al. | 507/241 |
| 6,379,612 B1 | 4/2002 | Reizer et al. | 422/7 |
| 6,380,136 B1 | 4/2002 | Bates et al. | 507/90 |
| 2004/0043906 A1* | 3/2004 | Heath et al. | 507/200 |

FOREIGN PATENT DOCUMENTS

| | | |
|---|---|---|
| WO | WO93/22537 | 11/1993 |
| WO | WO01/94744 A1 | 12/2001 |

* cited by examiner

*Primary Examiner*—Philip C. Tucker
(74) *Attorney, Agent, or Firm*—Madan, Mossman & Sriram, P.C.

(57) ABSTRACT

Disclosed is a method for introducing additives into an oil, gas, or water injection well or pipeline in solid form at a location other than at the bottom. The method is practiced using pellets having a density sufficient to suspend the pellet at a top phase, bottom phase or at the interface of two phases of fluid within a wellbore. The pellets are prepared from a pellet matrix, such as an ethoxylated wax, and a weighting agent as well as an additive. By varying the amount of weighting agent, the density of the pellet can be varied to suspend it at a desired point to for a time sufficient to deliver the additive to the desired point within the wellbore.

13 Claims, 5 Drawing Sheets

METHOD FOR CONTROLLED PLACEMENT OF OILFIELD CHEMICALS AND COMPOSITION USEFUL FOR PRACTICING SAME

RELATED APPLICATIONS

This application claims priority from U.S. Provisional Patent Application Ser. No. 60/404,733 filed Aug. 20, 2002.

BACKGROUND OF THE INVENTION

1. Field of the Invention

This invention relates to a method for treating oil, gas, and water injection wells with chemicals useful for reducing corrosion, scale, asphaltenes and other undesirable conditions, and a composition for practicing the method. This invention particularly relates to a method for the controlled placement of such chemicals, the controlled release of these chemicals, and a composition useful for practicing the method.

2. Background of the Art

Fluids produced from oil wells penetrating an oil-bearing formation primarily include crude oil and water and are herein referred to as formation fluids. A formation fluid may also contain natural gas which may or may not be desirable and may be the primary product of a given well in which case the well is referred to as a gas well. A formation fluid may also contain $CO_2$ and will often contain oil and water insoluble compounds such as clay, silica, waxes, and asphaltenes, which exist as colloidal suspensions. In addition to the already listed components, formation fluids can also include inorganic components that can precipitate to form mineral scales These materials may be undesirable in the exploration for and production of oil and gas.

It is known in the art of oil and gas production to eliminate or mitigate the effects these undesirable materials. For example, during oil and gas production in production wells, the drilling of new wells, or workovers of existing wells, many chemicals, referred herein as "additives", which include scale inhibitors, paraffin inhibitors, corrosion inhibitors and the like, are often injected from a surface source into the wells to treat the formation fluids flowing through such wells to prevent or control the precipitation of mineral scale, paraffins, and to protect the well against corrosion. These additives can be injected continuously or by batches through a conduit or tubing that is run from the surface to a known depth within the formation, typically upstream of the problem location. In addition, an additive can be injected into a near wellbore formation via a technique commonly referred to as "squeeze" treatment, from which the additive can be slowly released into the formation fluid. Sometimes, additives are introduced in connection with electrical submersible pumps, as shown for example in U.S. Pat. No. 4,582,131, or through an auxiliary line associated with a cable used with the electrical submersible pump, such as shown in U.S. Pat. No. 5,528,824. In addition, in wells without a packer in the completion, additives may be applied via pump or truck into the annular space between the tubing and the casing with a fluid flush driving the additive into the formation fluids.

In most of these operations, the additives are in the form of aqueous microemulsions or admixtures, although organic solutions are also known. The use of liquid additives is not without problems. In cold weather, the additives may freeze or gel during transportation or use. Supplying a source of heat, particularly for remote well sites can be a problem.

Supplying additives in the form of emulsions and solutions can also be an expense. Solutions and emulsions are, by their natures, composed of mostly inactive materials: water and/or solvents. It would be desirable in the art of treating oil wells to supply additives in a form that is economical to ship and handle and does not require co-shipping inactive components.

While using solid additives would seem to be a good means of avoiding the problems associated with additive solutions and emulsions, it too is not without problems. One such problem is metering solids. The metering of solids into an oil well could be both expensive and prone to blockages and other conditions requiring maintenance. One solution to this problem is disclosed in U.S. Pat. No. 6,326,335 B1, to Kowlaski, et al. Therein it is disclosed to prepare a microencapsulated additive wherein the additive is incorporated into a gelatin capsule, weighted with a heavy metal compound. In Kowlaski, the capsules are prepared to have a density such that they sink to the bottom of the well.

It would be desirable in the art of treating oil and gas wells with additives, to use solid additives that would release slowly with time. It would be particularly desirable to treat oil and gas well with solid additives that would not require heavy metals as weighting agents. It would also be particularly desirable in the art of treating oil and gas wells with additives to locate the additives at the point within the well that requires the treatment for which the additives are used.

SUMMARY OF THE INVENTION

In one aspect, the present invention is a method for treating an oil or gas well having a column of fluid within the wellbore by introducing chemicals into the column of fluid including introducing the chemicals into the column of fluid in the form of pellets having a density less that that of the fluid at the well bottom and about the same as the fluid at the point within the wellbore at which it would be desirable to introduce the chemicals.

In another aspect, the present invention is a pellet for treating an oil or gas well having a column of fluid within the wellbore including a pellet having at least two layers, a first layer surrounding a second layer, and at least one additive, and a weighting agent, wherein the density of the first layer is different from the density of the second layer.

BRIEF DESCRIPTION OF THE DRAWINGS

For a detailed understanding and better appreciation of the present invention, reference should be made to the following detailed description of the invention and the preferred embodiments, taken in conjunction with the accompanying drawings.

DETAILED DESCRIPTION OF THE PREFERRED EMBODIMENT

Figure 1:
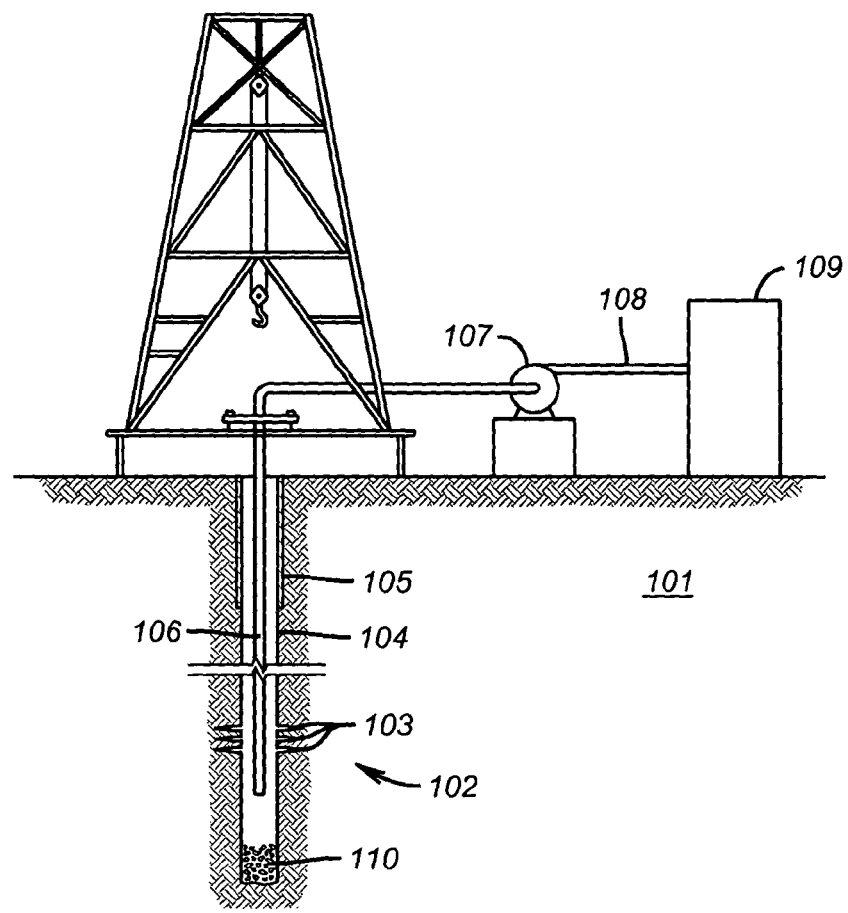
FIG. 1 is a schematic illustration of an oil well.

In one embodiment, the present invention is a method for treating an oil well having a column of fluid within the wellbore. In FIG. 1, such an oil well is illustrated. During the production of oil and gas, formation fluid flows from an oil and gas bearing formation 102 through perforations 103 into the wellbore 104. The wellbore 104 is lined with at least one pipe and often a series of pipes referred to in the art as casing, the outer pipe 105 and production tubing, the inner pipe 106. The bottom of the well 110 is typically filled with gravel. The oil and gas is collected using a pipe referred to as production tubing 106 that runs to a pump 107 and then though a header 108 into a storage or transportation facility 109. The pump 107 may either be located at the surface, in which case it is often a rod pump or near the bottom of the well in which case it is often an electrical submersible pump. In a few rare cases for oil wells and in some gas wells, the formation fluids are free flowing and no pump is required.

Figure 2:
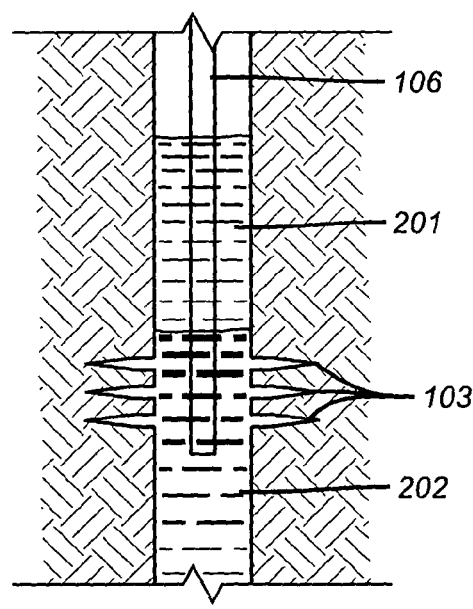
FIG. 2 is an enlargement of a section of the oil well showing a fluid column.

In FIG. 2, a column of fluid within the wellbore is illustrated. The column consists of two phases, a heavier phase 202 and a lighter phase 201. The heavier phase typically will have a greater water content while the lighter phase typically will consist primarily of hydrocarbons. The interface of the two fluids is just above the perforations 103 within the wellbore for the case shown though the interface may be significantly higher. The fluid column can have more than just two phases and can vary in density depending upon the conditions in the well.

It can be desirable to place additives into a wellbore at different locations. For example, it can be desirable to place additives into the fluid within the lighter hydrocarbon portion of the fluid column. It could similarly be desirable to place the additives into the fluid column at the interface of the fluid phases. It could also be desirable to place the additives within the heavier phase of the fluid column, but above the well bottom. The method of the present invention can be used to place the pellets containing additives useful with the present invention anywhere within discreet phases having differing viscosities within the column of fluid within the wellbore of an oil and gas well.

For example, in one embodiment of the present invention, a pellet including a corrosion inhibitor is used to treat an oil and gas well to protect the casing and production tubing from corrosion. While corrosion can occur where the casing is in contact with a light phase fluid consisting primarily of hydrocarbons, corrosion usually will occur more rapidly where the casing is in contact with a heavier phase having a higher water content. In such an instance, it may be desirable to prepare pellets having a density greater than that of the lighter phase but less than that of the heavier phase. Such a pellet, once introduced into the fluid column, would tend to remain at the interface of the two phases and could thereby release its additives into both the heavier and lighter phases of the fluid column. This would be particularly useful in applications where the two phases are relatively static such as a well having low production or one being shut in for service.

The choice of where to place an additive will vary from well to well. The parameters which could influence a decision as to where to place the pellets useful with the present invention include, but are not limited to: production rates, height of the fluid column, location of the interface of the fluid phases, location of the inlet of the production tubing in relation to the fluid phase interfaces, and the like. Preferably, the densities of the phases within the fluid column would be known or determined using conventional testing and modeling methods well known to those of ordinary skill in the art of producing oil and gas to be useful.

Once the density of the fluid phases within the wellbore is known, and a decision is made as to where to place the pellet, then an appropriate density for the pellet is selected. To place the pellet within a phase, the pellet should have the same density as the phase. To place the pellet between phases, the density of the pellet should be as close to the average density of the two phases as possible. The pellet is the prepared by admixing at least one additive, the pellet matrix, and sufficient weighting material to produce a pellet having the desired density. In the practice of the method of the present invention, the pellets useful with that method preferably have a density of from about 0.6 to about 1.3, more preferably have a density of from about 0.8 to about 1.2, and most preferably have a density of from about 0.9 to about 1.1.

In the method of the present invention, a pellet is used to introduce additives at a selected point within a fluid column in a gas and oil well. The additive is delivered to the selected location by adjusting the density of a pellet containing the additive using a weighting agent. The weighting agent can be any material having a density different than the active additive and that can be dispersed within a pellet useful with the present invention. A weighting agent may increase or decrease the effective density of the pellet. The weighting agent is preferably selected from the group consisting of inorganic safts that are sparingly soluble in formation fluids such as calcium sulphate, magnesium sulphate, calcium carbonate, titanium oxide, aluminum oxide, potassium chloride, sodium chloride, and mixtures thereof.

The additives of the present invention are introduced into oil and gas wells using pellets. The pellets have a pellet matrix and dispersed within the matrix the weighting agent and additive, preferably existing as tiny but discrete inclusions within the pellet. The pellets useful with the method of the present invention can be formed by any process known to those of ordinary skill in the art to be useful. For example, in one embodiment, the pellets are prepared in a pellet mill by forcing an admixture of additive, weighting agent and pellet matrix through a die under pressure pursuant to known processes using known machines. The pellets preferably have a major cross-sectional dimension that is greater than 0.05 mm but less than 1 mm. The pellets may be cut to particular desired lengths as extruded, but may also be allowed to break randomly to provide a pelletized product averaging between 0.2 mm and 0.5 mm in length.

In another embodiment, the pellets useful with the present invention are formed using a prilling process. In a prilling process, the admixture of weighting agent, additive and pellet matrix are spayed into a refrigerated cylinder and allowed to coalesce and form a pellet while in free-fall. Other means of preparing the pellets useful with the present invention include crystallization, precipitation, pan-coating, fluid-bed coating, fluid bed agglomeration, rotary atomization, extrusion, spheronization, drum granulation and high shear agglomeration, but any method capable of producing the pellets having utility with the method of the present invention can be used.

Additives useful with the method of the present invention include those used to prevent or mitigate the formation of scale, paraffins, asphaltenes, and emulsions. Other additives useful for preventing or mitigating the occurrence of corrosion, bacteria growth, and foaming can also be used with the method of the present invention. For example, when bacteria growth is an issue, the additive and can be a bactericide selected from the group consisting of formaldehyde, paraformaldehyde, glutaraldehyde, ammonia, quaternary ammonium compounds, sodium hypochlorite, phenols, and mixtures thereof. Any bactericide known to those of ordinary skill in the art to be useful can be used with the method of the present invention.

When the additives used with the method of the present invention are corrosion inhibitors, they preferably are selected from the group consisting of carboxylic acids and derivatives such as aliphatic fatty acid derivatives, imidazolines and derivatives; including amides, quaternary ammonium salts, rosin derivatives, amines, pyridine compounds, trithione compounds, heterocyclic sulfur compounds, quinoline compounds, or salts, quats, or polymers of any of these, and mixtures thereof. For example, suitable inhibitors include primary, secondary, and tertiary monoamines; diamines; amides; polyethoxylated amines, diamines or amides; salts of such materials; and amphoteric compounds. Still other examples include imidazolines having both straight and branched alkyl chains, phosphate esters, and sulfur containing compounds.

Another additive useful with the present invention is a paraffin inhibitor. Dispersants that act as solubilizing agents for paraffin, e.g., nonionic and anionic surfactants can also be used with the present invention. Paraffin inhibitors can also be long chain polymers and/or surface-active materials. Any paraffin inhibitor useful known to be useful to those of ordinary skill in the art can be used with the present invention.

Still another additive that can be used with the method of the present invention is an asphaltene inhibitor. Suitable asphaltene treatment chemicals include those such as alkylphenol ethoxylates and aliphatic polyethers.

Another additive that can be used with the present invention includes the scale inhibitors. Scale Inhibitors that can be used with the method of the present invention include phosphate esters, polyacrylates, phosphonates, polyacrylamides, and polysulfonated polycarboxylates.

The pellets useful with the present invention are prepared using a pellet matrix. The pellet matrix is the continuous phase within which the additive and weighting agent are dispersed. A pellet matrix useful with the present invention functions to slowly release the additive. With time, desirably, the pellet will shed sufficient additive and/or weighting agent to decrease in density to rise to the top of the fluid column. Most preferably the pellet matrix is one that will slowly dissolve in the fluid at the top of the fluid column to avoid a build up of pellets in the fluid column during extended periods of treatment with pellets.

Pellet matrices useful with the present invention are any which have the qualities set forth immediately above. Preferred pellet matrices useful with the present invention include, but are not limited to: linear alcohols, waxes, ethoxylates, sugars, ureas, starches, and mixtures thereof. Most preferably, the pellet matrices used to prepare the pellets useful with the method of the present invention are ethoxylated waxes.

In addition to the embodiments already described, the present invention also includes certain pellets. For example, in one embodiment, the present invention is a pellet useful for delivering at least one additive to two locations within the fluid column in an oil and gas wellbore. In this embodiment, a first pellet is prepared which has a relatively low density. This pellet is then coated with a second layer of pellet matrix, additive and weighting agent having a higher density. In this embodiment, the pellet could be used to first treat a denser phase of the fluid column, then shed the outer layer and treat a less dense phase. Other embodiments are also possible, including one were there are two separate additives, the first being a relatively dense additive which is quickly released and second additive which is released more slowly, the pellet losing density as the first, heavier additive is released.

In addition to the embodiments already described, the present invention also includes admixtures of pellets. For example, one pellet may contain a corrosion inhibiting additive and have a density suitable to be delivered between the light hydrocarbon based and the heavier water based phase. A second pellet may contain a foaming agent for the removal of water to be delivered into the heavier water based phase. The treatment for an oil or gas well may consist of a mixture of the two pellets delivered at one time. Any number or combination of different pellets may be delivered in one application according to the method of the present invention.

The inhibitors of the present invention are desirably slow release inhibitors. In the practice of the method of the present invention, preferably the rate of release of the inhibitors from the pellets is controlled by varying the size of the inclusions, or droplets, of the additives within the pellets or by varying the size of the pellets themselves. In another embodiment varying the chemical composition of the pellet matrix controls the rate of release. While not wishing to be bound by any theory, it is believed that the release rate is a function of droplet size and or pellet size. The larger the droplet or pellet size, the smaller the surface area relative to the droplet or pellet volume. In two pellets having the same additive loading, the pellets with larger droplets will release their additive more slowly than the pellets with smaller additives. Preferably, by controlling the shear rate when the pellet matrix and additive is admixed, the rate of release is controlled to be from about one month to one year, more preferably from about two months to about ten months, and most preferably from about two months to about six months.

The rate of release of additives from the pellets useful with the present invention can vary according to the type of additive and pellet matrix selected to prepare the pellets. Preferably, the pellets of the present invention will be used to release additive at a rate of from about 5 to about 500 parts per million of production fluid being produced from an oil and gas well with the value being the concentration required to obtain the desired result and performance from the chemical additive. The pellets will release at a fixed rate based upon the size of the pellet or droplet size of the additive within the pellet, so the dosage for a given well can be adjusted according to the production rate for the subject oil and gas well.

The method of the present invention is practiced by introducing additives to the fluid column in an oil and gas well in the form of a pellet. The pellets are preferably suspended in a liquid and pumped into the annulus between the well casing and the production tubing. In the alternative, the pellets can be poured, washed or otherwise transported into the annulus, subject to ensuring that they are delivered to the annulus in such a fashion that they can rise or sink to the desired location within the column of fluid within the wellbore.

Since formation fluids also traverse pipeline after the well, the same pellets may also be applied into a pipeline system to achieve the same beneficial results from chemical additives. The pellets may be introduced suspended in a liquid, washed or dropped into the pipe system, or placed in a restraining device such as a basket or cloth holder.

While the present invention is directed primarily to oil and gas well, the method of the present invention is can be used with any kind of well wherein there is a column of fluid within the well. While the claims recite an oil or gas well, this is done to facilitate searching using electronic searching devices and it is understood that the claims also are to the use of the method of the present invention with any kind of well having a column of fluid within the wellbore.

EXAMPLES

The following examples are provided to illustrate the present invention. The examples are not intended to limit the scope of the present invention and they should not be so interpreted. Amounts are in weight parts or weight percentages unless otherwise indicated.

Example 1

A pellet useful with the method of the present invention is prepared by admixing at a high shear rate imidazoline corrosion inhibitor (20 weight percent Baker Petrolite CRO111), calcium carbonate, and an ethoxylated wax having about 100 moles of ethylene oxide moieties per mole of wax (70 percent Baker Petrolite Polywax® 1000). The admixture is prepared and then pelletized by prilling. The pellets have a mean diameter of less than 1000 microns. The pellets have an average density of 1.0 specific gravity unit (sgu).

Figure 3:
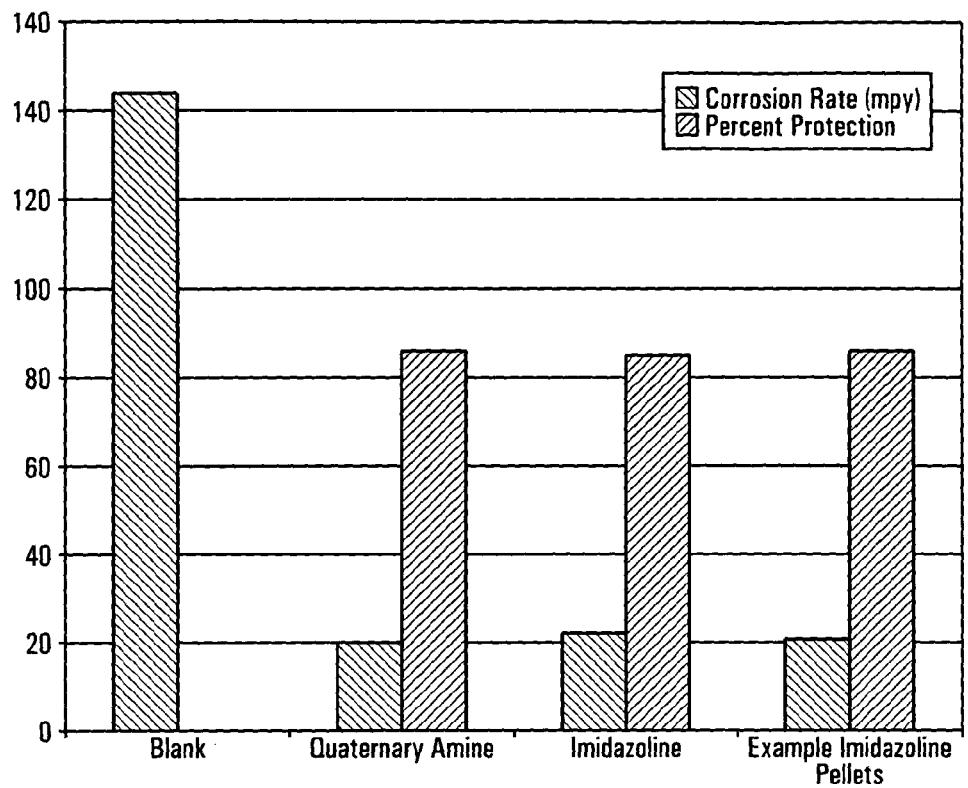
FIGS. 3 and 4 are graphical representations of data from Example 1.

Standard sparged beaker and kettle tests are run for 1 to 5 days, to determine if the pellets inhibited corrosion when compared to standard inhibitors. The results are presented in FIG. 3.

Figure 4:
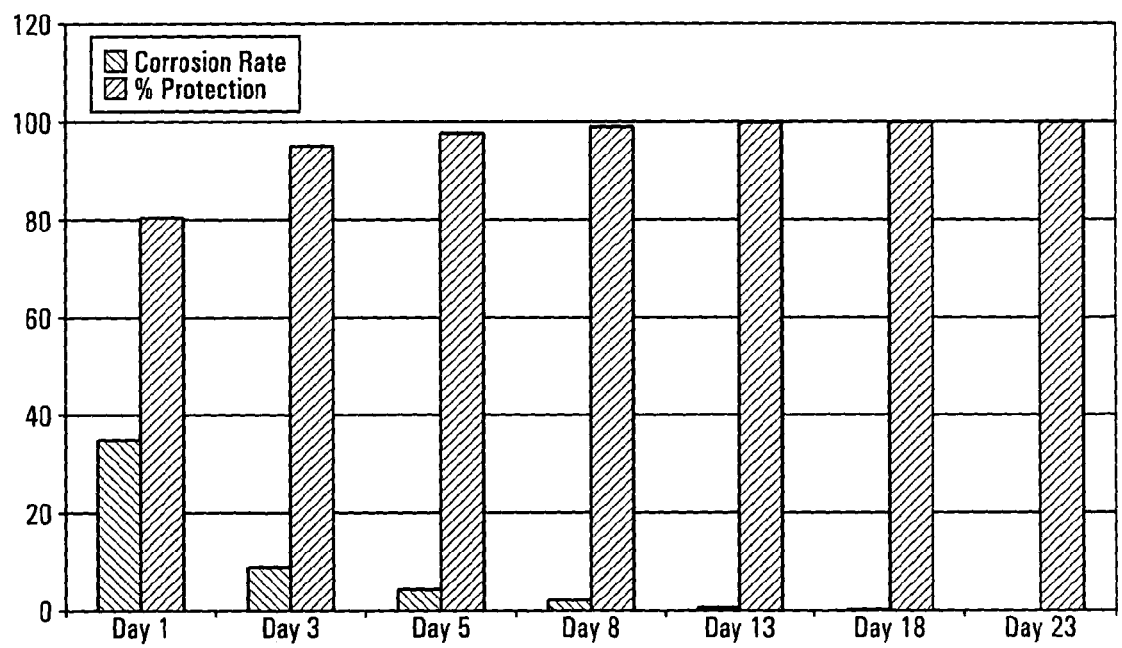
Figure 5:
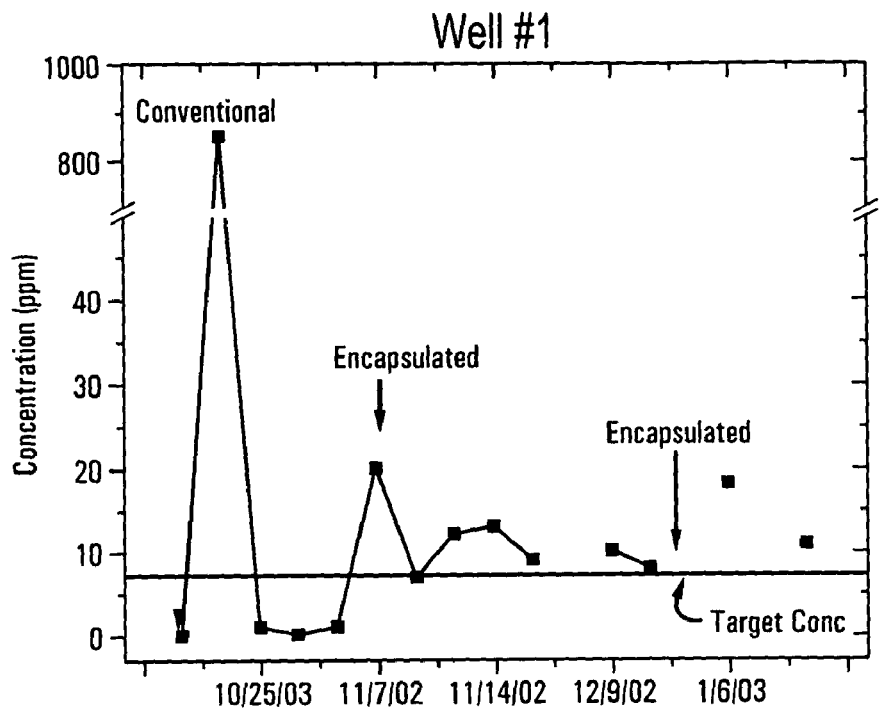
FIGS. 5–10 are graphical representations of data from field trials of the method of the present invention.
Figure 6:
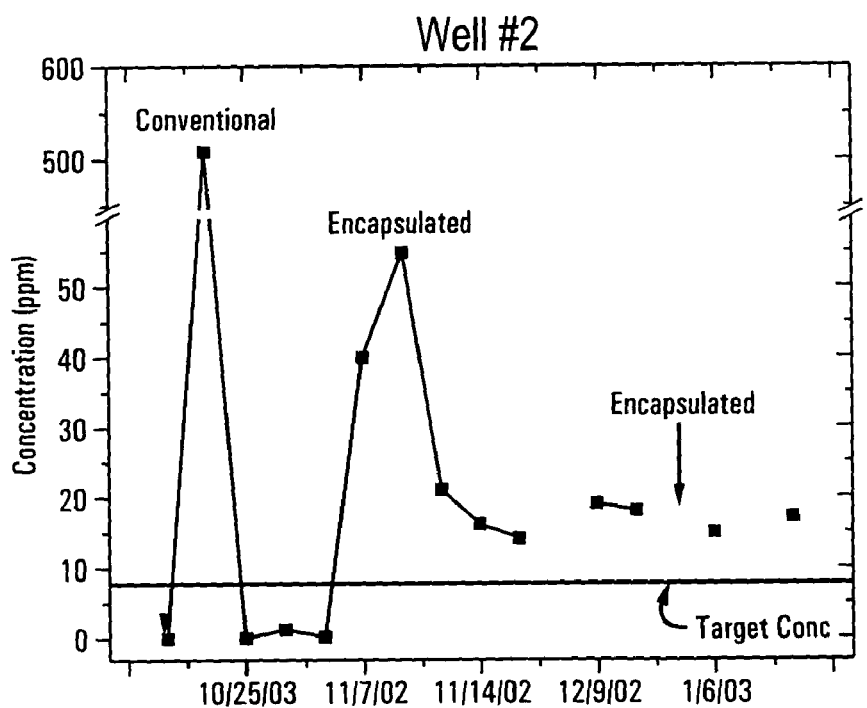
Figure 7:
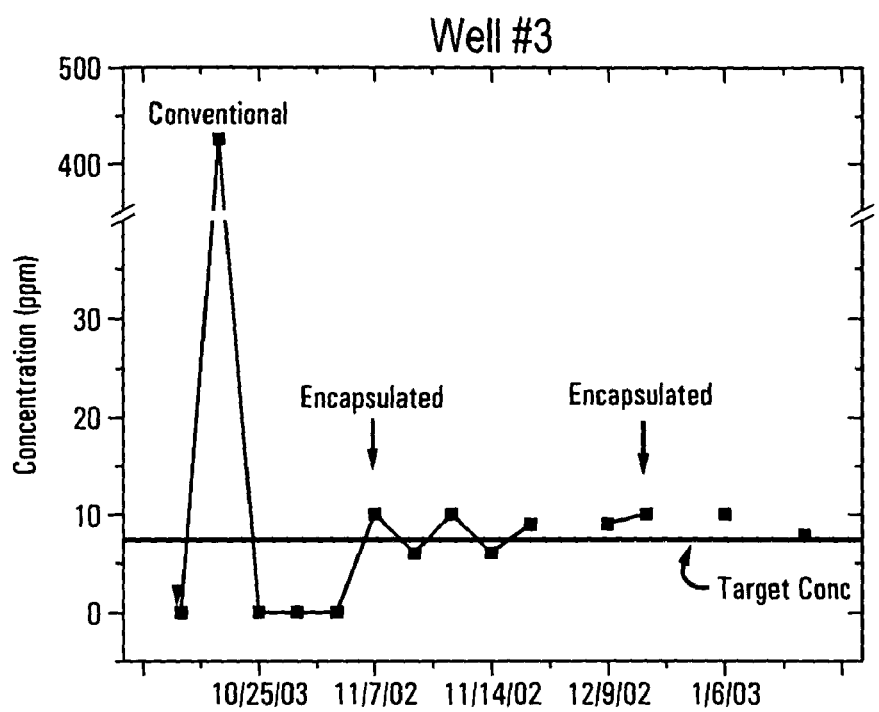
Figure 8:
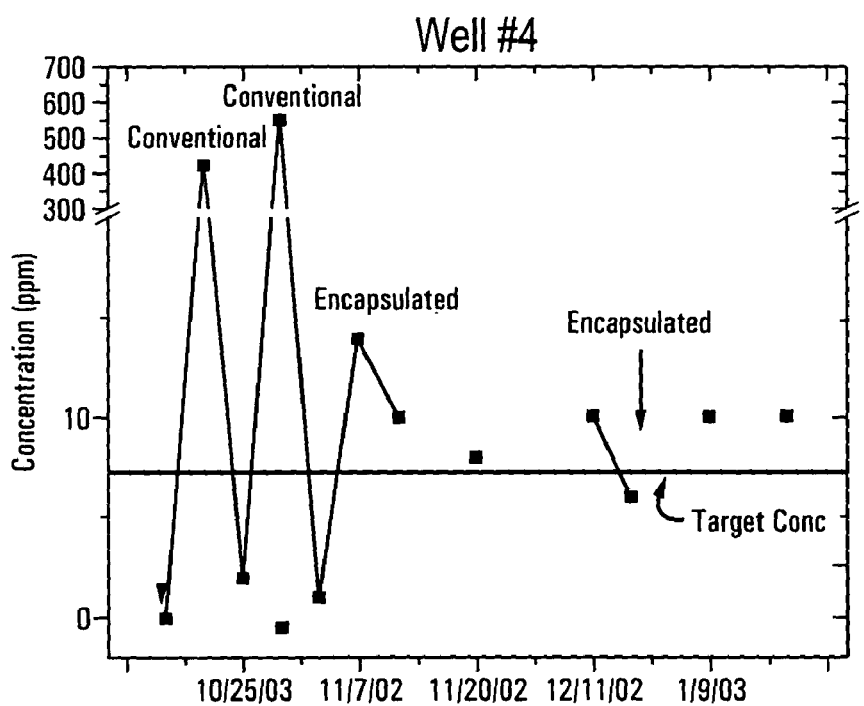
Figure 9:
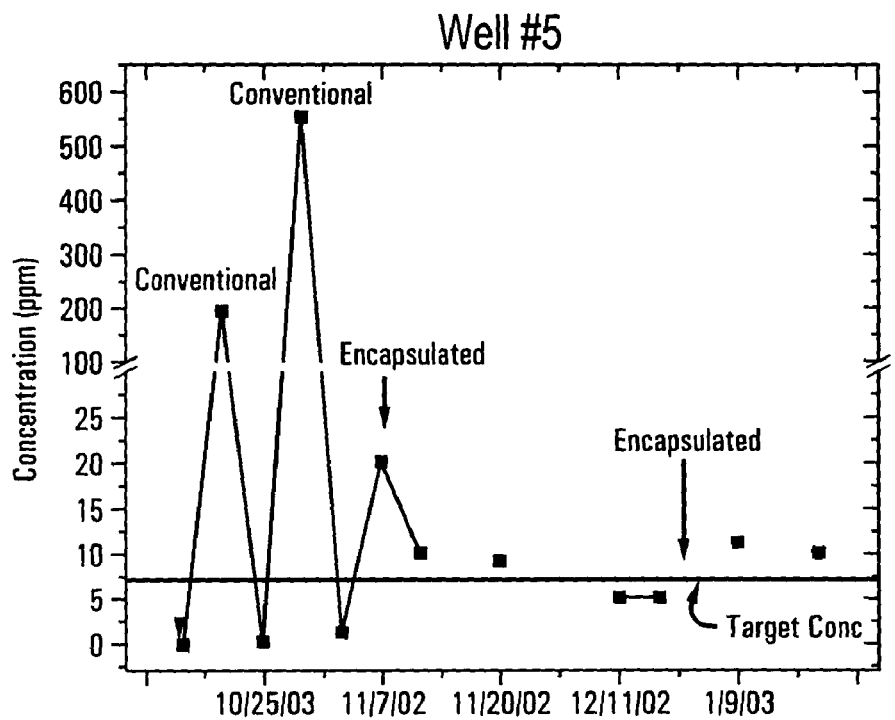
Figure 10:
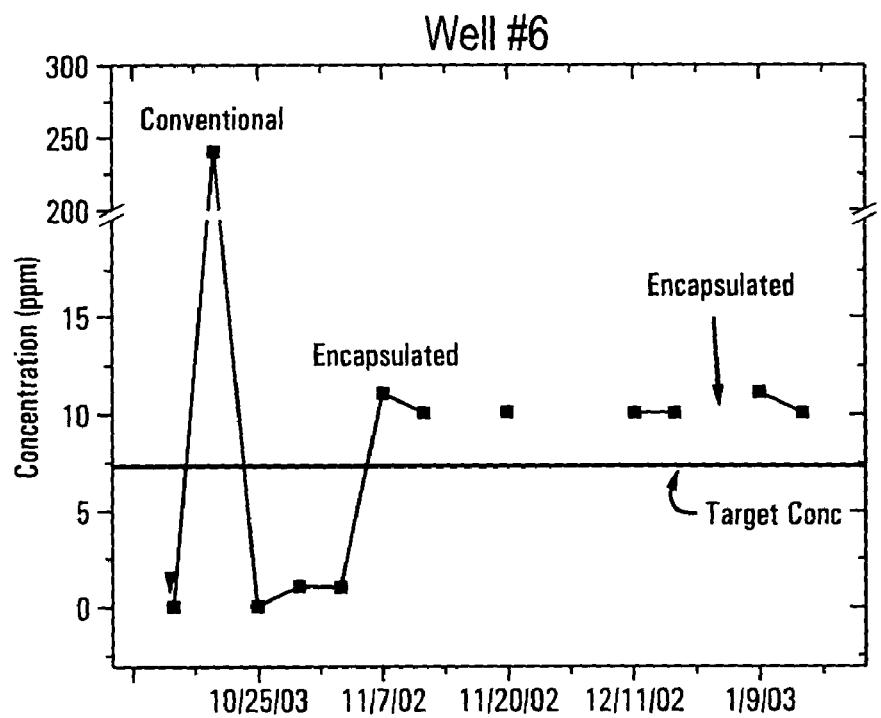

In the long term testing, kettle test cells are prepared identically but coupons were inserted at spaced time intervals with linear polarization resistance (LPR) measurements and weight loss being measured over 24 hours. A series of bottles with 100 percent Isopar M®, 100 percent brine, or 80/20 brine/oil are prepared with 0.175 grams of pellets. The bottles are kept at 180° F. (82.2° C.) for a set period of time. At the given time, a single bottle is removed and the remaining pellets captured by filtration and dried to a constant weight. A total of 84 bottles pellets are prepared for a test to run three months. The release rate for each bottle is determined by mass difference. Based upon this static data, the pellets provide a constant release rate for 1.5 to 2 months. The results are presented in FIG. 4.

Flow through beaker testing at 120° F. (48.9° C.) using three liters was run for 4 days to compare corrosion inhibition performance between CRO111 within a pellet and conventional CRO111. The flow rate was such that the entire fluid was replaced 9 times per day. Chemical residuals were run to confirm the concentration of inhibitor. Based upon the static release rates and the measured inhibitor residual, the pellet product under the flow through beaker test should provide a constant inhibitor rate for between 1.1 and 1.6 months. The data is displayed below in Table 1.

TABLE 1

| Time (days) | Brine | | 80/20 Brine/Isopar M | | Isopar M | |
|---|---|---|---|---|---|---|
| | Mass Loss | Rate (%/hr) | Mass Loss | Rate (%/hr) | Mass Loss | Rate (%/hr) |
| 1  | 0.004 | 0.0868 | 0.008 | 0.1736 | 0.011 | 0.2387 |
| 3  | 0.005 | 0.0362 | 0.011 | 0.0796 | 0.038 | 0.2749 |
| 10 | 0.011 | 0.0239 | 0.032 | 0.0694 | 0.127 | 0.2756 |
| 17 | 0.014 | 0.0179 | 0.049 | 0.0626 | 0.169 | 0.2157 |
| 24 | 0.021 | 0.0190 | 0.073 | 0.0660 | 0.181 | 0.1637 |
| 31 | 0.024 | 0.0168 | 0.098 | 0.0686 | 0.183 | 0.1281 |
| 38 | 0.031 | 0.0177 | 0.121 | 0.0691 | 0.191 | 0.1091 |
| 45 | 0.033 | 0.0159 | 0.142 | 0.0685 | 0.187 | 0.0902 |

TABLE 1-continued

| Time (days) | Brine | | 80/20 Brine/Isopar M | | Isopar M | |
|---|---|---|---|---|---|---|
| | Mass Loss | Rate (%/hr) | Mass Loss | Rate (%/hr) | Mass Loss | Rate (%/hr) |
| 52 | 0.037 | 0.0154 | 0.164 | 0.0684 | 0.189 | 0.0789 |
| 59 | 0.039 | 0.0143 | 0.204 | 0.0750 | 0.188 | 0.0692 |

Examples 2–6

Six oil wells are treated first with a conventional liquid corrosion inhibitor and then with the encapsulated corrosion inhibitor of Example 1. The conventional corrosion inhibitor treatment is applied by direct injection downhole and the level of corrosion inhibitor is measured in the production fluid for the periods noted in FIGS. 5–10.

The wells are then treated using the method of the present invention where an encapsulated corrosion inhibitor is also injected downhole and the level of corrosion inhibitor is measured in the production fluid for the periods noted in FIGS. 5–10.

During the course of the treatments, the concentration of corrosion inhibitor is measured as a function of time and is displayed below in FIGS. 5–10 wherein it can be observed that the concentration of corrosion inhibitor is maintained at a concentration much closer to the target concentration using the method of the present invention as compared to conventional application of corrosion inhibitor.

What is claimed is:

1. A method for treating an oil or gas well having a column of fluid within the wellbore by introducing chemicals into the column of fluid comprising introducing the chemicals into the column of fluid in the form of pellets having a density less that that of the fluid at the well bottom and about the same as the fluid at the point within the wellbore at which it would be desirable to introduce the chemicals wherein the point within the wellbore at which it would be desirable to introduce the chemicals is at the interface two phases of fluid within the column of liquid in the wellbore.

2. The method of claim 1 wherein the point within the wellbore at which it would be desirable to introduce the pellets is at the top of the column of liquid in the wellbore.

3. The method of claim 1 wherein the pellets have a density of from about 0.6 to about 1.3.

4. The method of claim 3 wherein the pellets have a density of from about 0.8 to about 1.2.

5. The method of claim 4 wherein the pellets have a density of from about 0.9 to about 1.1.

6. The method of claim 1 wherein the pellets are prepared with a weighting agent selected from the group consisting of calcium sulphate, magnesium sulphate, calcium carbonate, titanium oxide, aluminum oxide, potassium chloride, sodium chloride, and mixtures thereof.

7. The method of claim 1 wherein the pellets have a major cross-sectional dimension that is greater than 0.05 mm but less than 1 mm.

8. The method of claim 1 wherein the chemicals are additives.

9. The method of claim 8 wherein the additive is used to prevent or mitigate the formation of scale, paraffins, asphaltenes, and emulsions.

10. The method of claim 8 wherein the additive is used to prevent or mitigate the occurrence of corrosion, bacteria growth, and foaming.

11. The method of claim 8 wherein the additive is used to remove liquid from a wellbore for example by inducing foaming.

12. The method of claim 8 wherein the pellets have two different additives in the same pellet.

13. The method of claim 8 wherein the pellets are a mixture of pellets having one additive per pellet and some of the pellets have a first additive and other pellets have a second additive.

* * * * *